April 5, 1932. J. COLLARD 1,852,769
INTERFERENCE DETERMINING
Filed Nov. 21, 1928
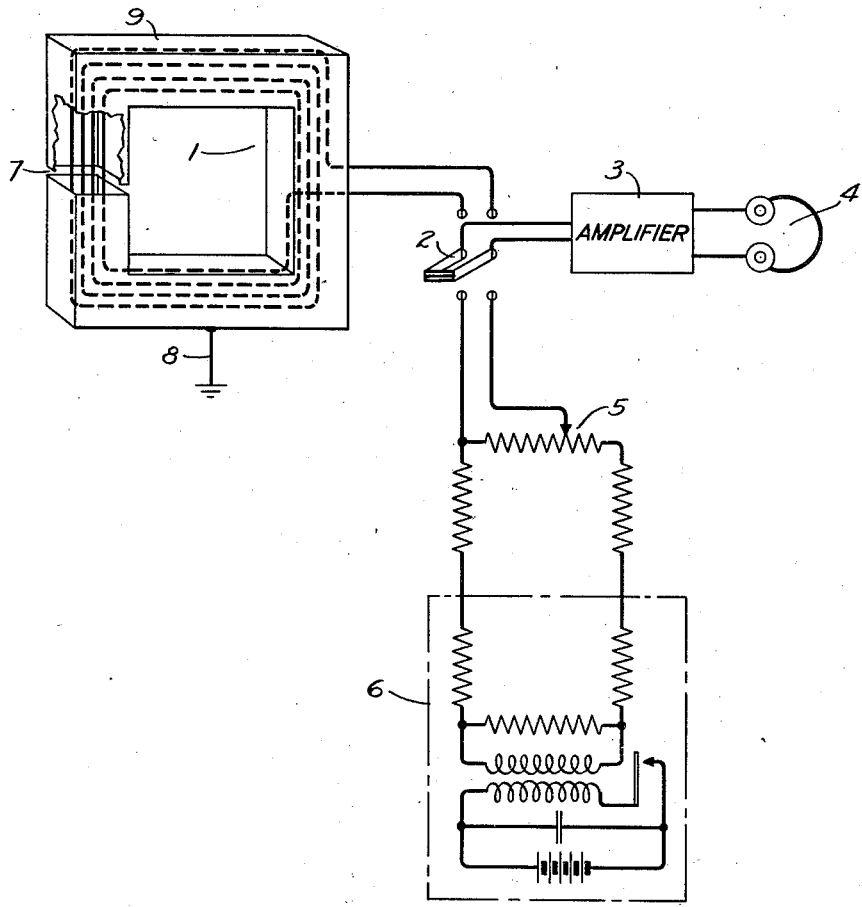
INVENTOR
J. COLLARD
BY
ATTORNEY Patented Apr. 5, 1932

1,852,769

UNITED STATES PATENT OFFICE

JOHN COLLARD, OF ALDWYCH, LONDON, ENGLAND, ASSIGNOR TO WESTERN ELECTRIC COMPANY, INCORPORATED, OF NEW YORK, N. Y., A CORPORATION OF NEW YORK

INTERFERENCE DETERMINING

Application filed November 21, 1928, Serial No. 320,789, and in Italy December 5, 1927.

This invention relates to electrical measuring systems and particularly to systems for measuring small currents induced in electrical communication lines.

When an electric signaling cable is situated in proximity to a power line or the like, there are set up therein induced currents which often interfere with the efficient transmission of the signal.

It was realized by the inventor that if a knowledge of the magnitude of the disturbance which would be set up in a signaling conductor or cable due to the presence at a certain distance therefrom of a power line, were available before the installation of the cable or line, as the case may be, it would be useful in determining the minimum allowable distance between the cable and power line. Alternatively, the information would be useful in designing a cable to occupy a particular position with respect to such power lines so that the interference may be reduced to practical limits.

An object of this invention is to provide a simple and accurate measuring circuit for obtaining this data.

To accomplish this object the conditions of service must be simulated during the measuring operation in order to obtain results which are accurate. Briefly, in one aspect the invention is a method of determining what would be the magnitude of interference from a power line at a point in a prospective neighboring signaling cable which comprises introducing an electrostatically shielded test conductor at that point, amplifying the induced currents and comparing the noise magnitude with a noise standard. By so doing, the magnitude of the interference in terms of E. M. F. may be obtained so that the conditions above referred to may be adjusted to meet requirements.

In order that the invention may be readily understood reference will be made to the accompanying drawing which illustrates the invention schematically.

The apparatus comprises a coil 1 encased in an electrostatic shield 9. To the terminals of this coil is connected a double-pole double-throw switch 2. This switch permits the coil to be connected to an amplifier 3 in whose output is situated a receiver 4 which may be of the ordinary telephone headset type. The switch 2 may be so moved that it connects the input of amplifier 3 to a noise measuring set 5, 6, instead of to the coil 1. The noise measuring set consists of a potentiometer 5 and a standard vibrating element or noise standard 6, well known in the art. The potentiometer 5 is provided with a scale giving readings proportional to the noise transmitted.

In carrying out the method of the invention the coil 1 is placed in the position where it appears suitable to lay the cable, and the switch 2 is moved so as to couple the coil 1 to the amplifier 3. The magnitude of the noise is heard in receiver 4. The switch 2 is now thrown over and the noise measuring set 5, 6 is connected to the amplifier. Potentiometer 5 is now adjusted until the noise heard in the receiver 4 is judged to be the same as that in the first instance when it was connected to the coil 1. The reading of the potentiometer scale gives the value of the noise transmitted. By taking similar readings at several points the best position in which to lay the cable may readily be obtained. Alternately, having given a fixed position, it is possible to determine the amount of induction in this position and consequently design the cable to reduce the noise to a permissible value.

Since a signaling cable is always provided with a metallic covering generally in the form of a lead sheath, which acts as an electrostatic shield to the conductors thereof, it is essential that the coil 1 which is subject to the same field, also be provided with a metal cover 9 as shown, so that more exact conditions are simulated. The cover has a gap or discontinuity 7 so as to prevent a neutralization of the induction in coil 1 as would otherwise occur. As the cable sheath is generally grounded, the cover should be grounded as shown at 8.

What is claimed is:
1. A measuring system for determining the inductive interference effect that an interfering line would produce in an electro-statically shielded conductor of a communication cable at a point in the neighborhood of the interfering line, said system comprising an exploring conductor, an electrostatic shield therefor adapting the exploring conductor to simulate the shielded conductor of the communication cable with respect to the magnitude of the interference received from the interfering line and means for indicating the amount of interference induced in said exploring conductor.

2. The method of determining what would be the magnitude of the interference from a power line at a point in a prospective neighboring signaling cable which comprises introducing an electrostatically shielded test conductor at that point, amplifying the currents induced in the test conductor and comparing the noise magnitude with a noise standard.

3. A measuring circuit for measuring the inductive interference at a point in the neighborhood of a power line, comprising a standard source of frequencies, an amplifier for amplifying said frequencies, a receiver for registering the amplitude of said frequencies, an exploring coil for simulating the lines in which said interference will actually be induced, and means for connecting said coil and said frequency standard alternately to said amplifier and said receiver.

4. A measuring circuit in accordance with claim 3 in which said coil has a grounded electrostatic shield to simulate a communication cable line.

In witness whereof, I hereunto subscribe my name this 2nd day of November, 1928.

JOHN COLLARD.